Figure 1:
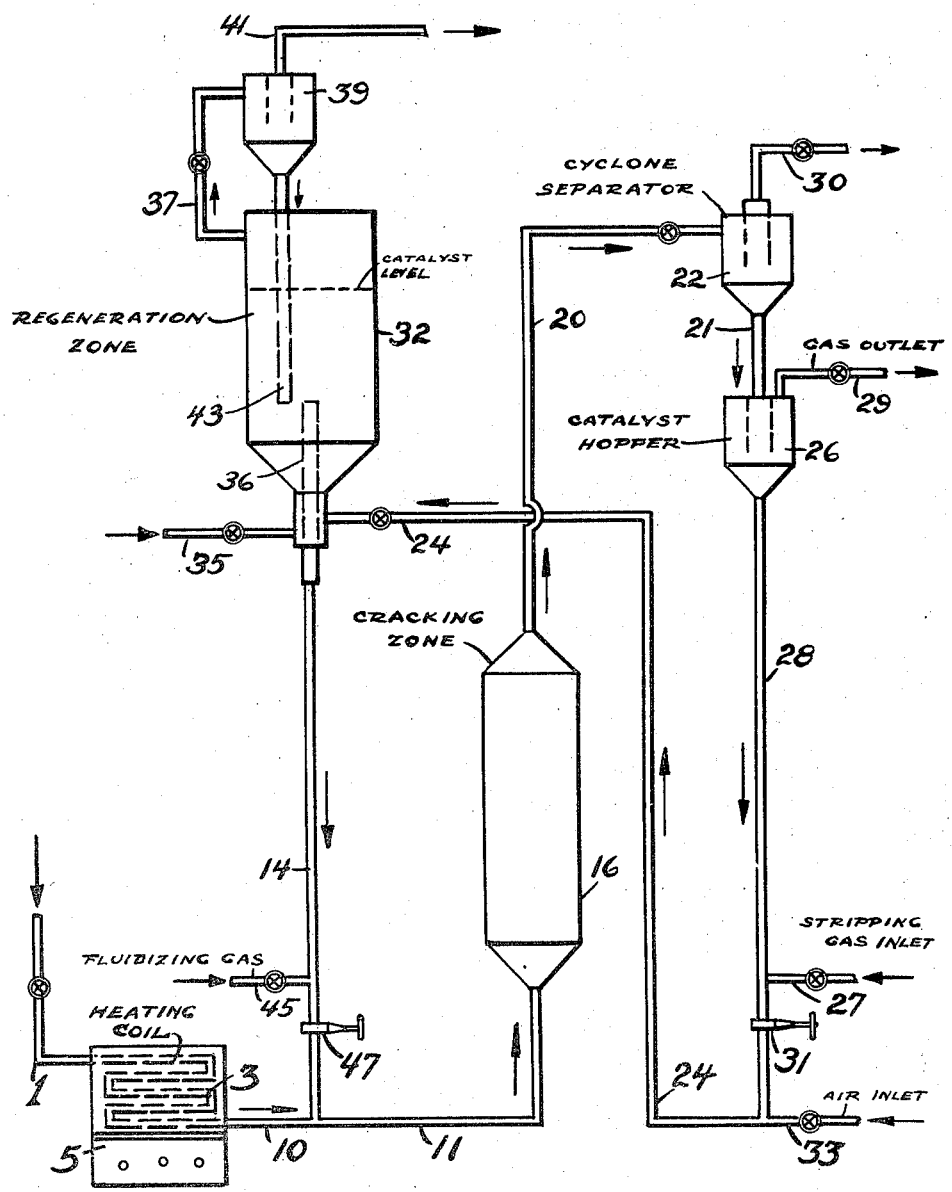

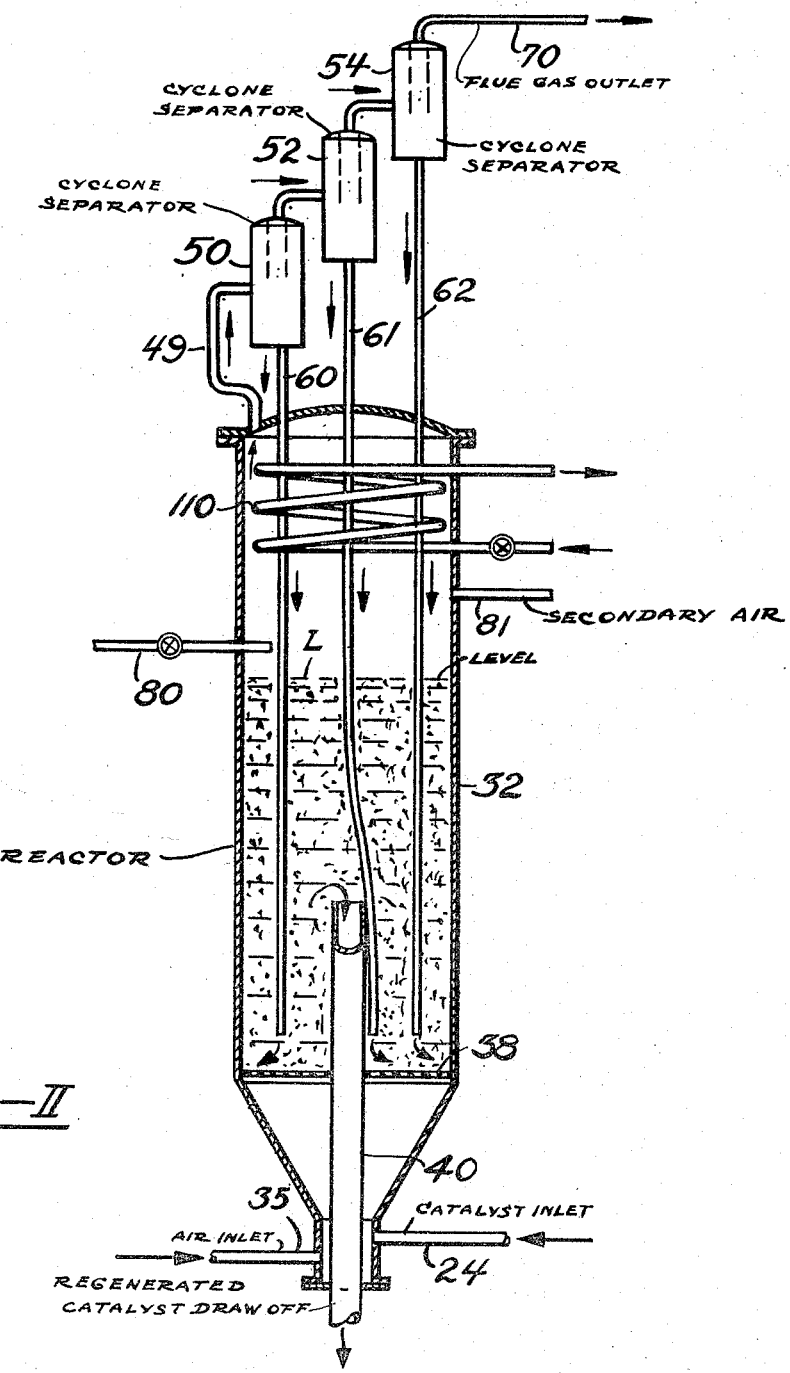

Patented Aug. 14, 1945

2,382,382

UNITED STATES PATENT OFFICE 2,382,382

PROCESS FOR THE REACTIVATION OF CATALYST

Leonard E. Carlsmith and Henry J. Ogorzaly, Baton Rouge, La., assignors to Standard Oil Development Company, a corporation of Delaware Application January 8, 1942, Serial No. 425,978

10 Claims. (Cl. 252—242)

The present invention relates to the art of refining petroleum oil, and in particular it relates to improvements in regenerating a powdered catalyst which is fouled in a continuous process of cracking hydrocarbon oils in vapor phase in the presence of said catalyst.

As is generally known, during the last ten or fifteen years the gasoline requirements for making a fuel suitable for use in the modern automobile have increased sharply as regards octane rating. The older thermal methods for cracking gas oils to produce gasoline fail to produce a gasoline of sufficiently high octane rating unless tetraethyl lead is added to be usable in the modern automobile. Consequently, the industry, as the result of considerable research, has developed the so-called "catalytic oil cracking" method, or rather, several of them, in which a feed stock such as gas oil is cracked in vapor phase in the presence of a powdered cracking catalyst such as an acid-treated clay.

Our present invention relates, generally, to improvements in a process for cracking hydrocarbon oils catalytically in a continuous operation wherein the oil is vaporized and thereafter the catalyst is suspended in the oil and the suspension is conducted to a reaction zone where it is permitted to remain under cracking conditions for a sufficient period of time to effect the desired conversion. Thereafter, the cracked products are separated from the catalyst and fed into a recovery system to obtain the desired finished products. The catalyst, on the other hand, is regenerated and redelivered to the reaction zone for further use in the process and, as stated, the present invention resides in an improved regeneration process.

Our invention will be best understood by reference to the accompanying drawings in which we have shown in Fig. I, diagrammatically, a flow plan illustrating the principal steps of a catalytic cracking operation operating continuously employing a powdered catalyst, and in Fig. II we have shown an enlarged view of a regenerator which we propose to use in a manner which hereinafter will be more fully explained.

Referring to Figure I, a charging stock such as a West Texas gas oil is fed into the system through line 1 and thence discharged into coil 3 located in furnace 5 where the oil is vaporized. The vaporized oil is then withdrawn from the coil 3 through line 10 and mixed with catalyst in powdered form discharged from standpipe 14. The suspension of catalyst in the vaporized oil is passed through line 11 into cracking zone 16.

The temperature of the reaction zone 16 may be maintained at about 900° F. The suspension of catalyst in oil vapors remains in the reaction zone for a sufficient time to produce the desired products, whereupon the products of the reaction and the catalyst suspended therein are withdrawn through line 20 and delivered to a separation zone which may comprise a cyclone separator 22 where the products, that is to say, the gasoline, gas and gas oil, are withdrawn through line 30 while the catalyst drops through line 21 into catalyst hopper 26. The catalyst then flows into standpipe 28 into which an inert aeration and stripping gas or vapor is injected by means of line 27, as well as at other points if desired, to maintain the catalyst in a freely flowing condition and to strip adsorbed hydrocarbons from the contaminated catalyst. The excess gas is removed from catalyst hopper 26 by means of line 29. The rate of flow of the fluidized catalyst through standpipe 28 is regulated by means of slide valve 31.

Air is injected below slide valve 31 by means of line 33 in order to resuspend the powdered catalyst. The suspension of catalyst in air or other regeneration gas is then passed by means of line 24 into the bottom of regeneration zone 32. Additional air may be added through line 35 if desired. The carbonaceous contaminants deposited on the catalyst in reaction zone 16 are removed by combustion with the regeneration gas in regeneration zone 32. The operation of the regeneration process will be described in greater detail hereinafter.

The regenerated catalyst is withdrawn from regeneration zone 32 by means of line 36 and thence passes into standpipe 14. The spent regeneration gases with a relatively small amount of suspended regenerated catalyst are carried overhead from regeneration zone 32 through line 37 and into a separation zone such as cyclone separator 39. The spent regeneration gases are withdrawn through line 41 and the separated catalyst is returned to regeneration zone 32 by means of dip-pipe 43. Fluidizing and stripping gas are injected into standpipe 14 by means of line 45 as well as at other points if desired. The rate of flow of catalyst through standpipe 14 is controlled by means of slide valve 47. As previously described the regenerated catalyst from standpipe 14 is mixed with vaporized oil from line 10 and passed to the cracking zone 16 for further use.

For the sake of simplicity numerous details have been omitted from the description of the operation. For example, single cyclone separators have been shown whereas in practice it may be desirable to use several such separation means. Also, it will be understood that any of the known methods of controlling temperatures in the regeneration zone 32 such as recycling of cooled regenerated catalyst may be used if desired.

Our invention, as indicated, applies merely to one feature of the process illustrated in Fig. I, namely, improvements in the regeneration of the catalyst. We shall now proceed to describe the real gist of our invention and in doing so, shall refer to Fig. II which shows a regenerator 32 in detail. Regeneration vessel 32 in the form shown in Fig. II consists, essentially, of a cylindrical vessel having a conical base. The catalyst suspended in air is fed to the regenerator through line 24. Additional air may be added through air inlet line 36 if desired, which is usually the case. The suspension of catalyst in air, or other regeneration gas, is forced into the regenerator and passes upwardly through a foraminous member or grid 38 into the regenerator where the carbonaceous deposits on the catalyst are consumed by combustion, the catalyst acquiring a temperature of about 1150° F. We prefer to operate the regenerator by imparting to the air a linear velocity of from one half to five feet per second, whereupon the catalyst in 32 forms a dense phase having an upper level at about L. This dense phase has a density of 10 to 40 lbs./cu. ft. Above the level L the density of the suspension becomes greatly diminished near the top, having a value of about 0.01–0.1 lb./cu. ft. The flow conditions specified permit bottom draw-off or withdrawal of regenerated catalyst through draw-off pipe 40.

The gases which are withdrawn overhead from reactor 32 pass successively through cyclone separators 50, 52, and 54, and the catalyst is recovered through dip pipes 60, 61, and 62 from the said cyclones. The flue gas, substantially depleted of all catalyst, is withdrawn through line 70, and this gas may be sent to a waste heat boiler or through a turbine engine to recover at least a portion of its energy content.

The general method of regenerating a catalyst, that is to say, as to temperature, conditions, pressure, etc., are generally well known in the art and do not per se form an important part of our invention. It is known, for instance, that acid-treated clay should not be treated at temperatures much above 1150° F., since this results in destroying permanently the catalyst activity.

The novel feature of our invention resides in carrying out the regeneration in such a manner that we burn the combustible material in the regeneration gas in the space above level L to the top of the regenerator. We have found that this gas contains as much as 5% or more of carbon monoxide. Presumably combustion of this carbon monoxide gas within the dense catalyst phase is prevented by the presence of large amounts of carbon acting as a reducing agent. We have found that above the catalyst level L, where the amount of catalyst is small and consequently the carbon surface able to affect the combustion reaction is relatively insignificant, it is possible to effect substantially complete combustion of the carbon monoxide. Consequently, we propose to do two things as follows: namely, to cause a pilot flame 80 to burn within the space above the catalyst level L, such as to ignite the carbon monoxide in the gas leaving the dense catalyst phase and to raise the temperature in the space above level L considerably, say in the region of 1350° F. or higher; also, if desirable, to bleed into the space above the level L a small amount, say 2 or 3% or more, of air based on the volume of gas passing through this space. This secondary air entering through line 81 will aid in the combustion of the carbon monoxide so that the gas in the space above the level L may be substantially completely converted to carbon dioxide.

We furthermore propose to recover this heat by circulating a cooling fluid such as water, but preferably oil, in a heat exchanger unit such as coil 110 deposed as shown in the drawing in the top of the regeneration vessel. For instance, the oil here employed to abstract the heat may be the original charging oil; it may also be water which may be converted to superheated steam for use in the present or some other process. Obviously, any cooling fluid, such as mercury, molten salts, lead, and the like, may be used in the place of water or oil.

It is obvious that many modifications of the invention may suggest themselves to those who are familiar with this art.

What we claim is:

1. In the continuous regeneration of a powdered catalyst material containing carbonaceous deposits, the improvement which comprises feeding the powdered fouled catalyst together with regeneration gas containing free oxygen upwardly into the lower portion of a reaction zone, regulating the flow of regeneration gas to such a value that the catalyst forms a lower phase of high density within the reaction zone and above that a phase of extremely low density, burning carbonaceous deposits from the catalyst within said phase of high density, burning in said phase of extremely low density combustible substances passing from said phase of high density with the regeneration gas into said phase of extremely low density, withdrawing the bulk of regenerated catalyst downwardly from said phase of high density, withdrawing spent regeneration gas upwardly from said zone of extremely low density and recovering a substantial portion of the heat of said phase of extremely low density by means of a fluid being in heat exchange relationship with the regeneration gas after its entry into said phase of extremely low density.

2. In the regeneration of a fouled powdered catalyst containing carbonaceous contaminants, the improvement which comprises maintaining a suspension of the catalyst in regeneration gas in a dense phase in a regeneration zone, burning carbonaceous contaminates from the catalyst in said dense phase, causing regeneration gases containing combustibles to flow upwardly from said dense phase into a catalyst suspension phase of extremely low density within said regeneration zone, burning combustibles in said latter phase thereby raising the temperature of the latter phase to a higher level than that existing in the dense phase, withdrawing the bulk of regenerated catalyst downwardly from said dense phase and withdrawing spent regeneration gas upwardly from said phase of extremely low density.

3. A process of regenerating powdered contact material which comprises feeding powdered fouled material and regeneration gas containing free oxygen into a regeneration zone, regulating the flow of upwardly flowing regeneration gas to form a dense catalyst phase and above that a light catalyst phase in said regeneration zone, passing the regeneration gas containing combustible material from the dense phase to the upper light phase and igniting and burning the combustible material in the light phase to raise the temperature in the light phase higher than that in the dense phase and recovering a substantial portion of the heat liberated in the light phase from the regeneration gas after its entry into said light phase.

4. The process set forth in claim 1 in which additional regeneration gas containing free oxygen is discharged into the light phase zone.

5. The process set forth in claim 1 in which the cooling fluid in the light phase zone is charging oil.

6. The process set forth in claim 1 in which the cooling fluid is water.

7. The process set forth in claim 2 in which gas containing free oxygen is directly added to the phase of extremely low density.

8. The process set forth in claim 1 wherein an igniting flame is maintained in said light phase zone and additional regeneration gas containing free oxygen is introduced into said light phase zone.

9. A process of regenerating powdered contact material which comprises feeding powdered fouled material and regeneration gas containing free oxygen into a regeneration zone, regulating the flow of upwardly flowing regeneration gas to form a dense catalyst phase and above that a light catalyst phase in said regeneration zone, passing the regeneration gas containing combustible material from the dense phase to the upper light phase and igniting and burning the combustible material in the light phase to raise the temperature in the light phase higher than that in the dense phase and recovering a substantial portion of the heat liberated in the light phase.

10. A process according to claim 9 wherein the heat is recovered in the light phase by indirect heat exchange with a fluid medium.

LEONARD E. CARLSMITH.
HENRY J. OGORZALY.